Jan. 9, 1934.  R. V. ZIMMER  1,942,738
MEANS FOR ATTACHING A FISHING LINE TO A BOB
Filed July 26, 1933
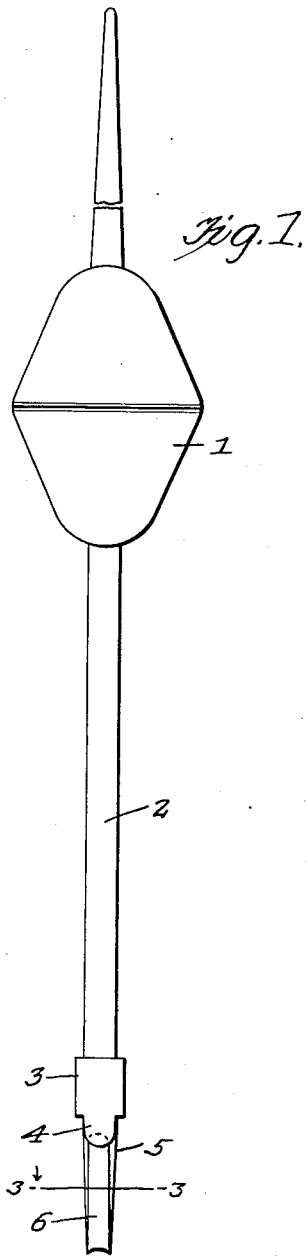
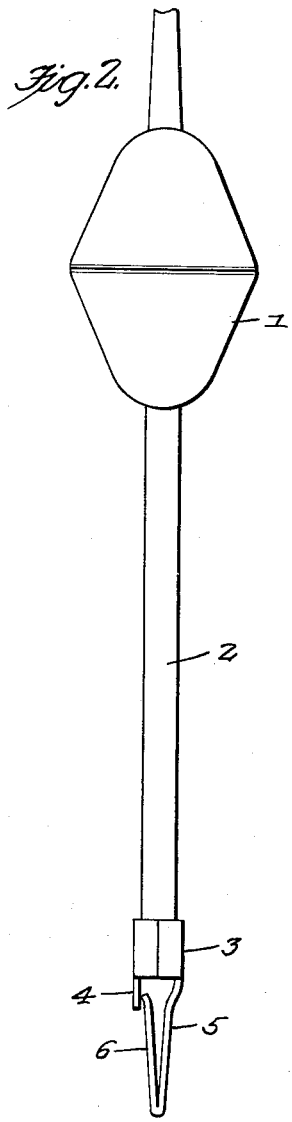
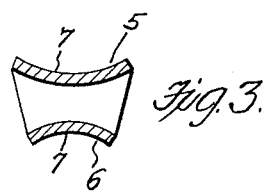
Inventor
R. V. Zimmer,
By *Clarence A. O'Brien*
Attorney Patented Jan. 9, 1934

1,942,738

UNITED STATES PATENT OFFICE 1,942,738

MEANS FOR ATTACHING A FISHING LINE TO A BOB

Raymond V. Zimmer, Warsaw, Ind.

Application July 26, 1933. Serial No. 682,346

3 Claims. (Cl. 43—49)

This invention relates to means for attaching a fishing line to a bob, the general object of the invention being to provide a V-shaped clamping member on the stem of the bob for clamping the line, with means whereby the line can be easily and quickly engaged by the clamp or disengaged therefrom.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view of a bob, with the invention attached thereto.

Figure 2 is a similar view, but taken at right angles to Figure 1.

Figure 3 is a section on line 3—3 of Figure 1.

In this drawing, the numeral 1 indicates the bob and the numeral 2 the stem thereof. In carrying out my invention, I provide a sleeve 3 which is attached to the lower end of the stem and said sleeve has a short projection 4 depending from one side thereof, the lower end of which is rounded, as shown in Figure 1, and a stationary jaw 5 depends from the opposite side of the sleeve and the movable or spring jaw 6 is connected to the lower end of the jaw 5 and has its free end bearing against the inner face of the projection 4. The entire device can be formed of a single piece of spring metal, with the jaws 5 and 6 formed of an elongated strip bent into a substantially V-shaped clip, as shown in Figure 2.

Thus a line can be passed between the jaws 5 and 6 and pulled down into the crotch of the space formed by the jaws, so that the jaws will clamp the line and thus the line will be attached to the bob. When the line is to be removed, the line is moved back over the free end of the jaw 6 and pulled out under the projection 4.

In order to prevent the jaws from cutting the line, I make each jaw of arcuate shape in cross section, as shown at 7 in Figure 3, with its convex side innermost.

By having the free end of the jaw 6 engage the inner face of the projection 4, the jaw parts are prevented from breaking or bending when the line is placed in the crotch or space between the jaw members.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. Means for attaching a line to the stem of a bob, comprising a sleeve attached to a part of the stem, a pair of spring jaws, one of which is fastened to the sleeve, said jaws forming a wedge-shaped space for receiving and holding the line, and a projection on the sleeve, the inner face of which is engaged by the free end of the movable jaw.

2. Means for attaching a line to the stem of a bob, comprising a sleeve attached to a part of the stem, a pair of spring jaws, one of which is fastened to the sleeve, said jaws forming a wedge-shaped space for receiving and holding the line, a projection on the sleeve, the inner face of which is engaged by the free end of the movable jaw, each jaw having a convex inner face.

3. Means for attaching a line to the stem of a bob, comprising a sleeve attached to a part of the stem, a pair of jaws one of which is fastened to the sleeve and the other of which is resilient and is movable toward and from the jaw fastened to the sleeve, said jaws being adapted to receive and hold a line between them, and a projection on the sleeve, the inner face of which is engaged by the free end of said movable jaw.

RAYMOND V. ZIMMER.